(12) United States Patent
Weintraub et al.

(10) Patent No.: US 10,364,893 B2
(45) Date of Patent: Jul. 30, 2019

(54) KEY SEAL AND VALVE

(71) Applicant: Proserv Operations, Inc., Houston, TX (US)

(72) Inventors: Preston Weintraub, Spring, TX (US); Joseph Quackenbush, Houston, TX (US)

(73) Assignee: PROSERV OPERATIONS, INC., Houston, TX (US)

( * ) Notice: Subject to any disclaimer, the term of this patent is extended or adjusted under 35 U.S.C. 154(b) by 242 days.

(21) Appl. No.: 15/231,001

(22) Filed: Aug. 8, 2016

(65) Prior Publication Data

US 2016/0341314 A1    Nov. 24, 2016

Related U.S. Application Data

(63) Continuation of application No. 14/067,398, filed on Oct. 30, 2013, now Pat. No. 9,423,031.

(51) Int. Cl.
| | |
|---|---|
| *F02F 11/00* | (2006.01) |
| *F16J 15/16* | (2006.01) |
| *E21B 49/08* | (2006.01) |
| *F16K 11/07* | (2006.01) |

(52) U.S. Cl.
CPC ........... *F16J 15/164* (2013.01); *E21B 49/081* (2013.01); *F16K 11/0712* (2013.01)

(58) Field of Classification Search
CPC .......... F16J 15/021; F16J 15/022; F16K 1/36; F16K 1/46; F16K 3/18; F16K 3/26; F16K 3/262
See application file for complete search history.

(56) References Cited

U.S. PATENT DOCUMENTS

| 402,600 | A | * | 5/1889 | Kemp | B65D 39/12 220/235 |
|---|---|---|---|---|---|
| 4,336,946 | A | * | 6/1982 | Wheeler | F16J 15/32 277/529 |
| 4,968,197 | A | * | 11/1990 | Chen | F16L 55/132 138/90 |
| 5,035,265 | A | * | 7/1991 | Chen | F16L 55/132 138/89 |
| 5,797,431 | A | * | 8/1998 | Adams | F16L 55/136 138/89 |
| 6,702,024 | B2 | * | 3/2004 | Neugebauer | E21B 49/081 166/169 |
| 8,246,055 | B2 | * | 8/2012 | Asplund | F16L 55/1155 277/609 |

(Continued)

*Primary Examiner* — Vishal A Patel
(74) *Attorney, Agent, or Firm* — Patterson + Sheridan, LLP (57) ABSTRACT

A key seal preferably includes a first circular seal portion, a second rounded seal portion and a third rounded seal portion. The first circular seal portion preferably has generally circular cross-section. The second rounded seal portion preferably has a bottom side which is connected to the first seal portion, and has a cross-section which is smaller than that of the first circular seal portion. The third rounded seal portion preferably has a top side which is connected to the first seal portion, and has a cross-section which is smaller than that of the first circular seal portion. The first, second and third seal portions may be integrally formed. They key seal may be installed in a hydroseal assembly around the pin section of a hydroseal, and between a seal and a block section of the hydroseal.

10 Claims, 6 Drawing Sheets

(56) References Cited

U.S. PATENT DOCUMENTS

2004/0173976 A1* 9/2004 Boggs ................... F16J 15/164
  277/628
2004/0262007 A1* 12/2004 Neugebauer .......... E21B 49/081
  166/332.1

* cited by examiner

FIG. 1
(PRIOR ART)

OPEN

KEY SEAL AND VALVE

CROSS-REFERENCE TO RELATED APPLICATIONS

This application is a continuation of co-pending U.S. patent application Ser. No. 14/067,398, filed Oct. 30, 2013, which is herein incorporated by reference.

BACKGROUND OF INVENTION

Field of the Invention

This invention relates generally to a key seal and a seal assembly in which a key seal may be used, and, more particularly, to a seal having a modified cross section which may be used in a bi-directional seal assembly.

Description of the Related Art

Figure 1:
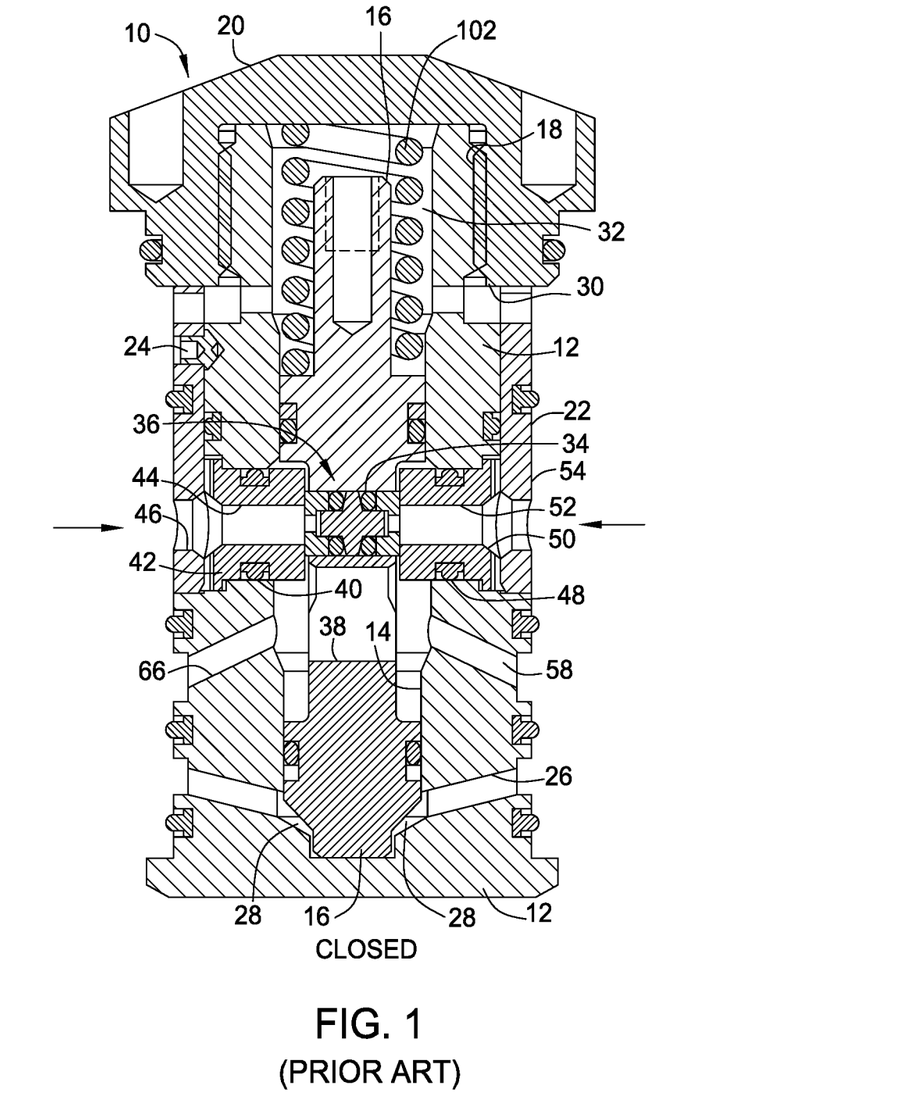
FIG. 1 is a section view of a prior art valve with a dual energized seal assembly. The valve is in the closed position in an unpressurized state.
Figure 2:
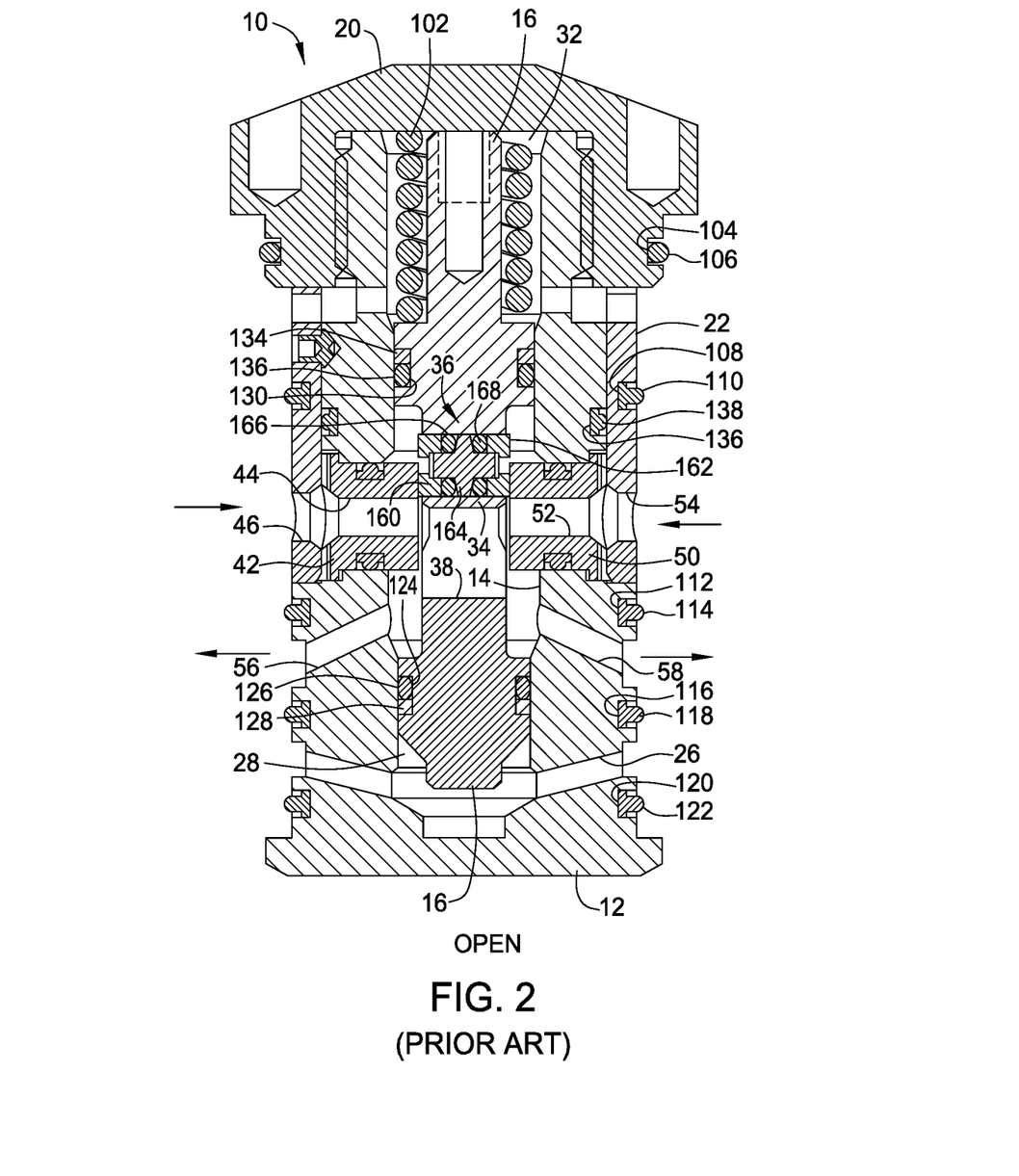
FIG. 2 is a section view of the prior art valve of FIG. 1 except the valve is in the open position and fluid is shown flowing through the valve by the flow allows.

Bi-directional seal assemblies function when pressure acts on them from two different directions. Such bi-directional seal assemblies are used in various different types of valves. For example, bi-directional seal assemblies are disclosed in U.S. Pat. Nos. 7,073,590 and 6,702,024. Such a prior art bi-directional seal assembly 36 is used in the dirty fluid valve 10 shown in FIGS. 1 and 2. Valve 10 may be positioned in a downhole tool that is used for sampling wellbore fluids. When the tool is inserted in the wellbore, the valve 10 is in the closed position as shown in FIG. 1. When the downhole tool reaches a depth that needs to be sampled, a pilot valve is pulsed, causing a seal carrier to slide the bi-directional seal assembly 36 along opposing seal plates 42, 50 so as to open the supply ports 46, 54, as shown in FIG. 2. This allows wellbore fluids to enter the supply ports 46, 54 of the dirty fluid valve 10 and move through the longitudinal passageway of the valve 10 and out the function ports 56, 58 to a sample collection bottle.

External pressures in a wellbore often exceed 20,000 psi absolute. After a sample has been collected, a pilot valve is pulsed, causing the seal carrier to move back to the close position as shown in FIG. 1. The pressure inside the sample collection bottle is the same as the pressure in the wellbore at the collection depth. As the downhole tool is brought back to the surface, external pressure drops to standard atmospheric pressure, but the pressure inside the sample collection bottle remains at wellbore pressure, which may be in excess of 20,000 psi absolute. Bi-directional seal assembly 36 must therefore function when pressure acts on it from below, as well as from supply ports 46, 54.

Figure 3:
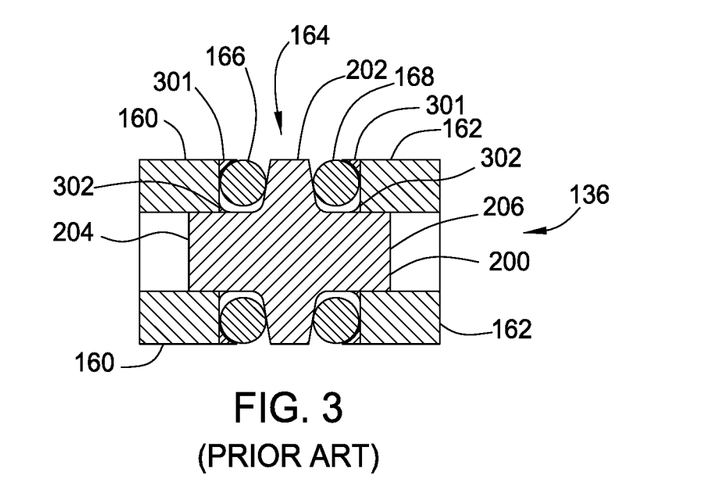
FIG. 3 is an enlarged sectional view of a prior art dual energized seal assembly as shown in FIGS. 1 and 2, with additional back-up rings.

FIG. 3 illustrates a cross-section of a prior art bi-directional seal assembly 136. This prior art seal assembly 136 includes a seal spool 164, first and second O-rings 166, 168, and first and second seal cups 160, 162. Four back-up rings 301, 302, 303, 304, are also shown. Although optional, these back-up rings generally help to prevent extrusion at higher pressures. First and second O-rings 166, 168 are installed around opposite ends 204, 206 of axle 200, with central collar 202 residing there between. First seal cup 160 engages with the first end 204 of axle 200, while the second seal cup 162 engages with the second end 206 of axle 200.

In operation, in the open position shown in FIG. 2, pressure coming from supply ports 46, 54, forces O-rings 166, 168 radially outward, somewhat deforming them into a shape with a generally oval cross-section. In this position, O-rings 166, 168 force seal cups 160, 162 outwardly against seal plates 42, 50, thereby creating a strong metal-to-metal seal. Once a sample has been collected and the valve 10 has shifted back into its closed position as shown in FIG. 1, the samples collected remain at their very high collection pressures. As the valve 10 and sample bottles are brought back to the surface, these high pressure samples exert pressure on the bi-directional seal assembly 36 from a different direction. This function pressure comes from function ports 56, 58, and passes up through longitudinal bore 14. The function pressure then forces O-rings 166, 168 radially inward, again somewhat deforming them into shapes with oval cross-sections. In this position, O-rings 166, 168 force seal cups 160, 162 outwardly against seal plates 42, 50, thereby creating a strong metal-to-metal seal.

Preferably, the O-rings 166, 168 are squeezed axially by seal cups 160, 162 against collar 202. O-rings 166, 168 are therefore energized, and press outwardly against the seal cups 160, 162 even when the valve 10 is at rest and no external pressures are exerted thereon, albeit less so than when the supply or function pressures act thereon. The seals used in bi-directional seal assemblies—as well as in other structures—are often used as energizers. Therefore, desirable spring characteristics in such seals are important, and it would be beneficial to use seals with better spring characteristics than that of standard O-rings.

SUMMARY OF THE INVENTION

One embodiment of the present invention relates to an annular key seal. Such a key seal preferably includes a first circular seal portion, a second rounded seal portion and a third rounded seal portion. The first circular seal portion preferably has generally circular cross-section, with a top side and a bottom side. The second rounded seal portion preferably has a bottom side which is connected to the top side of the first seal portion. The second rounded seal portion further preferably has a cross-section which is smaller than the cross-section of the first circular seal portion, and is preferably rounded on top. The third rounded seal portion preferably has a top side which is connected to the bottom side of said first seal portion. The third rounded seal portion further preferably has a cross-section which is smaller than the cross-section of the, first circular seal portion, and is preferably rounded on the bottom. The first, second and third seal portions may be integrally formed.

Additionally, the connection between the first and second seal portions preferably creates an inner upper shoulder and an outer upper shoulder, while the connection between the first and third seal portions creates an inner lower shoulder and an outer lower shoulder. A back-up ring is preferably positioned proximate at least one such shoulder, and more preferably proximate each such shoulder. A back-up ring is preferably radiused or concave toward the key seal.

At least one key seal is positioned within a hydroseal assembly. In an example embodiment, a hydroseal assembly is positioned in a transverse bore of a seal carrier in a valve. The seal carrier shifts from a closed position to an open position for taking and retaining samples. The valve preferably has a pair of opposing seal plates, and the hydroseal assembly is aligned with the seal plates when the seal carrier is in the closed position. The hydroseal assembly is out of alignment with the seal plates when the seal carrier is in the open position.

The hydroseal assembly preferably includes a hydroseal having a block section and a pin section. The hydroseal assembly also includes a seal through which a bore passes. The pin section of the hydroseal is received within the bore of the seal, such that the outer surface of the pin section is in contact with the inner surface of the seal. A key seal fits around the pin section of the hydroseal, such that it resides between the block section of the hydroseal and the seal.

Back-up rings may also be used in the hydroseal assembly. These back-up rings preferably help to prevent extrusion of the key seals through the bore of the seal cups and the transverse bore of the seal carrier.

While the disclosure is susceptible to various modifications and alternative forms, specific embodiments thereof are shown by way of example in the drawings and will herein be described in detail. It should be understood, however, that the drawings and detailed description presented herein are not intended to limit the disclosure to the particular embodiment disclosed, but on the contrary, the intention is to cover all modifications, equivalents, and alternatives falling within the spirit and scope of the present disclosure as defined by the appended claims.

DETAILED DESCRIPTION

Referring to FIG. 1, as noted above, a prior art dirty fluid valve is generally identified by the numeral 10. The valve 10 is a normally closed, two position, two-way valve. The valve 10 is sometimes referred to as a "cartridge" type valve, because it is often manufactured in the configuration of FIG. 1 and it is slipped into a valve chamber in the body of a downhole tool. The downhole tool typically has one or more dirty fluid valves, to test wellbore fluids at different well depths. Each valve 10 is in fluid communication with the wellbore and a sample collection bottle to hold wellbore fluids. The valve 10 is typically rated for operational pressures of up to 30,000 psi and temperatures of up to 350° F.

The valve 10 has a generally cylindrical body 12 which defines a longitudinal bore 14 which is sized and arranged to receive a seal carrier 16. The seal carrier moves from a normally closed position shown in FIG. 1 to an open position shown in FIG. 2.

The body 12 has threads 18 formed on one end to threadably engage the cap 20. A cylinder cover 22 surrounds a portion of the body 12. The cylinder cover 22 is rotationally held in place on the body by a set screw 24 and longitudinally in place by cap 20.

The body 12 defines an open pilot port 26 which is in fluid communication with an open chamber 28. The body 12 and the cylinder cover 22 define a close pilot port 30 which is in fluid communication with the close chamber 32 which is defined by the longitudinal bore 14 in body 12, the cap 20 and the seal carriers 16. The open pilot port 26 is in fluid communication with a pilot open valve, not shown. The close pilot port 30 is in fluid communication with a pilot close valve, not shown. Both pilot valves are connected to a source of pressurized pilot fluid, not shown.

The seal carrier 16 has a transverse bore 34 sized and arranged to receive a bi-directional seal assembly generally identified by the numeral 36. Bi-directional seal assemblies can take several forms, as will be discussed below. A transverse flow passageway 38 is also formed in the seal carrier 16 to facilitate fluid flow through the valve when it is in the open position.

A bore 40 is formed in the body 12 and is sized and arranged to receive the first seal plate 42. A through bore 44 is formed in the seal plate 42 and is in fluid communication with a supply port 46 formed in the cylinder cover 22.

A bore 48 is formed in the body 12 and is sized and arranged to receive the second seal plate 50. A through bore 52 is formed in the seal plate 50 and is in fluid communication with a supply port 54 formed in the cylinder cover 22. For purposes of claim interpretation, the body 12 and the cylinder cover 22 may collectively be referred to as the body, although for manufacturing convenience, they are produced as two separate parts.

When the downhole tool is placed in the wellbore, pressures may reach 30,000 psi, depending on the depth of the well. Wellbore fluids exert this "supply pressure" as indicated by the arrow in FIG. 1.

To shift the valve 10 from the closed position of FIG. 1 to the open position of FIG. 2, the pilot open valve is actuated allowing pilot pressure to enter the open port 26 and the open chamber 28. The force of the pressurized pilot fluid acting on the seal carrier 16 shifts it to the open position of FIG. 2.

Referring to FIG. 2, the valve 10 is shown in the open position. Wellbore fluids, indicated by the flow arrows, pass through the open ports 46 and 54 of the cylinder cover 22 and the through bore 44 and 52 of seal plates 42 and 50. The wellbore fluids then pass through the flow passageway 38 in the seal carrier 16, the longitudinal bore 14 and out the function ports 56 and 58, as indicated by the flow arrows, to the sample collection bottle, not shown. After the sample has been taken, the pilot close valve is actuated and pressurized pilot fluid enters the close port 30 and the close chamber 32. The pilot fluid is typically pressurized in the range of 1,500 to 10,000 psi. The force of this pilot fluid on the seal carrier causes it to shift from the open position of FIG. 2 to the closed position of FIG. 1. A spring 102 is positioned in the close chamber 32. A typical spring rate for the valve 10 is 261 lb./in. The spring 102 urges the seal carrier 16 into the normally closed position of FIG. 1.

An O-ring groove 104 is formed in the cap 20 and is sized and arranged to receive O-ring 106 which seals the cap 20 against the valve chamber in the downhole tool. A groove 108 is formed in the cylinder cover 22 and is sized and arranged to receive T-seal 110 which seals the cylinder cover 22 against the valve chamber in the downhole tool.

A groove 112 is formed in the body 12 and is sized and arranged to receive T-seal 114. A groove 116 is formed in the body 12 and is sized and arranged to receive T-seal 118. A groove 120 is formed in the body 12 and is sized and arranged to receive T-seal 122. T-seals 114 and 118 seal and isolate the function port 56 against the valve chamber in the downhole tool, not shown. T-seals 118 and 122 seal and isolate the pilot open port against the valve chamber in the downhole tool, not shown.

A groove 124 is formed in the seal carrier 16 and is sized and received to receive an O-ring 126 and a back-up ring 128. The O-ring 126 and backup ring 128 seal and isolate the open chamber 28 from the other flow passageways in the valve 10.

A groove 130 is found in the other end of the seal carrier 16 and is sized and arranged to receive an O-ring 132 and backup ring 134. The O-ring 132 and backup ring 134 seal and isolate the close chamber 32 from the other flow passageways in the valve 10.

The bi-directional seal assembly generally identified by the numeral 36 is positioned in the transverse bore 34 of seal carrier 16. The seal assembly functions when supply pressure (pressure from wellbore fluids) enters the through bore 44 of first seal plate 42 and the through bore 52 of seal plate 50 and is applied to the seal assembly 36. The seal assembly also functions when function pressure (pressure from the sample collection bottle) enters the longitudinal bore 14, and the transverse bore 34 in the seal carrier 16 and is applied to the seal assembly 36. The seal assembly 36 is therefore referred to as "bi-directional" because it functions when exposed to both supply pressure (pressure from wellbore fluids in the well) and function pressure (pressure from the stored wellbore fluids in the sample collection bottle).

FIG. 3 illustrates an enlarged view of a prior art seal assembly 136. The seal assembly 136 includes a first seal cup 160, a second seal cup 162, a seal spool 164, a first O-ring 166 and a second O-ring 168. The seal spool 164 has a central axle 200 bisected by a circular collar 202. The axle 200 has a first end 204 and a second opposing end 206. The seal spool 164 is shown in section view with two O-rings 166 and 168, each with two back-up rings 301, 302. The O-ring 166 fits on the first end 204 of axle 200 and the second O-ring 168 fits on the second end 206 of the axle 200. The circular collar 202 is formed on an angle of approximately 10°. However, a 90° angle between the collar 202 and the axle 200 also functions satisfactorily. Again, it is noted that other bi-directional structures may be used in place of seal assemblies 36 or 136, as will be discussed in detail below. Seal assemblies 36, 136 are merely non-limiting examples of assemblies which may be used in a valve 10.

O-rings are used in two basic applications generally referred to as "static" and "dynamic" by those skilled in the art. The O-rings 166 and 168 in the bi-directional seal assembly 136 are considered as static. In a static seal, the mating gland parts are not subject to relative movement. The transverse bore 34, the seal spool 164, and the seal cups 160 and 162 are nonmoving. O-rings 166, 168 are squeezed axially by seal cups 160, 162 against collar 202. Thus, O-rings 166 and 168 effectively act as springs within valve 10, even when at rest. They also act as springs when acted upon by supply and function pressure.

Figure 4:
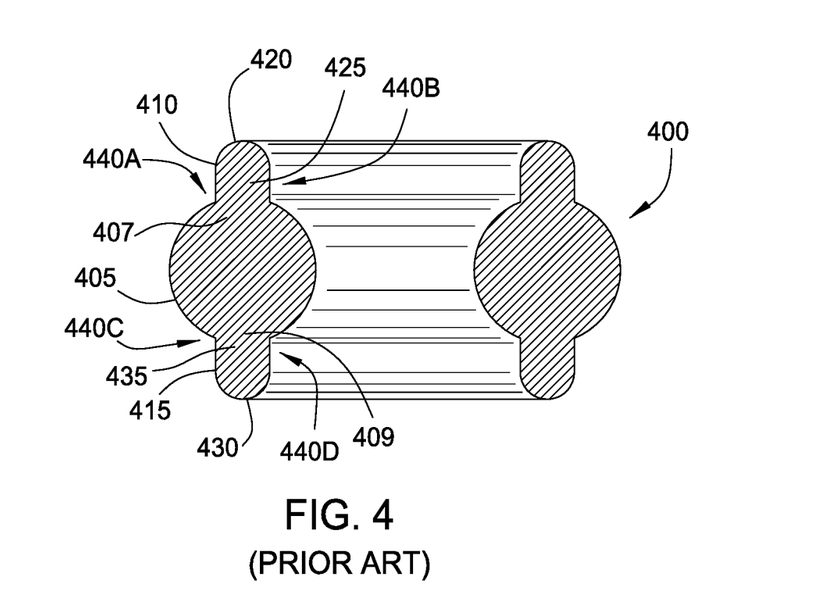
FIG. 4 is a sectional view of one embodiment of the present key seal constructed in accordance with the teachings of the present invention.

One embodiment of the present invention relates to an annular key seal 400, as shown in FIG. 4. Key seal 400, as shown, was designed to provide more linear spring characteristics over a wider range of pressures. Key seal 400 includes a first circular seal portion 405 having a generally circular cross-section. The first circular seal portion 405 has a top side 407 and a bottom side 409. The key seal 400 also includes a second rounded seal portion 410 and a third rounded seal portion 415. The second rounded seal portion 410 is positioned above the first circular seal portion 405, while the third rounded seal portion 415 is positioned below the first circular seal portion 405. Preferably, the second rounded seal portion 410 and the third rounded seal portion 415 have cross-sections which are smaller than the cross-section of the first circular seal portion 405.

The second rounded seal portion 410 has a top side 420 and a bottom side 425. Preferably, the top side 420 of the second rounded seal portion 410 is rounded, while the bottom side 425 of the second rounded seal portion 410 is connected to the top side 407 of the first circular seal portion 405. The third rounded seal portion 415 has a bottom side 430 and a top side 435. Preferably, the bottom side 430 of the third rounded seal portion 416 is rounded, while the top side 435 of the second rounded seal portion 415 is connected to the bottom side 409 of the first circular seal portion 405.

Figure 9:
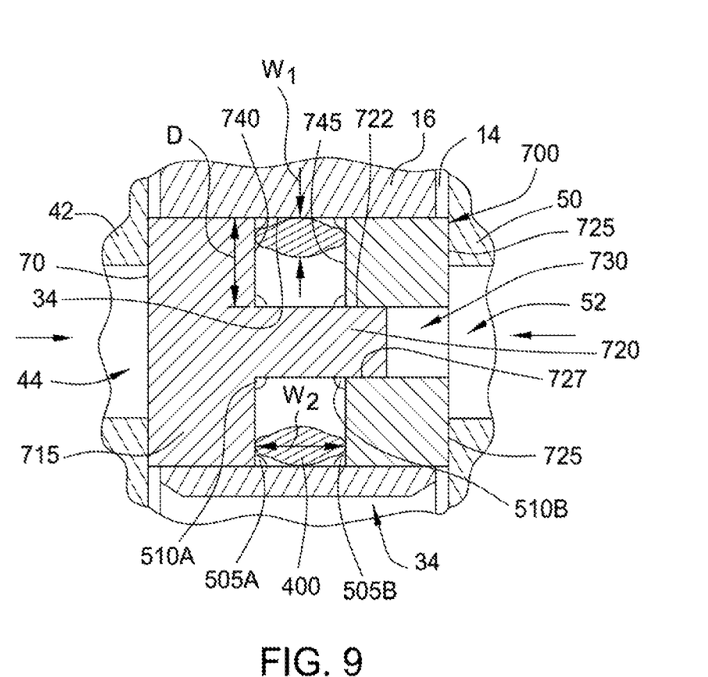
FIG. 9 is an enlarged sectional view of the hydroseal assembly of FIG. 7 as exposed to function pressure.

In one embodiment, the first, second, and third seal portions 405, 410, 415 are integrally formed. However, it is understood that the first, second, and third seal portions 405, 410, 415 could be formed separately and later assembled into key seal 400. When not integrally formed, the first, second and third seal portions 405, 410, 415 could be permanently connected, or may be releaseably connected together such as via friction. Integral formation is preferred, however, due to tolerance stack up, as would be understood. Separate components may not react evenly in certain situations. For example, seals may expand somewhat when heated. With multiple separate seal components, the various components may not expand evenly, leading to some diminution in performance. Together, as shown in FIG. 9, the first seal portion has a width W1 in a first direction, and the combination of the first, second and third seal portions 405, 410, 415 have a width in a second directed between the tips of the second and third portion of W2, greater than W1.

Figure 5:
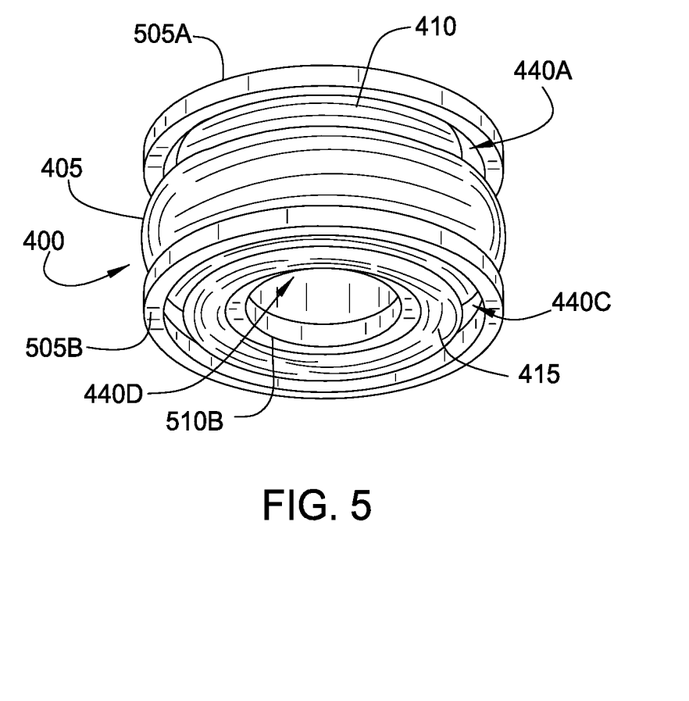
FIG. 5 is a perspective view of the key seal of FIG. 4 with four additional back-up rings in place.

About the connection between the second rounded seal portion 410 and the first circular seal portion 405, an outer upper shoulder 440A and inner upper shoulder 440B are formed. About the connection between the third rounded seal portion 415 and the first circular seal portion 405, an outer lower shoulder 440C and an inner lower shoulder 440D are formed. Backup rings may be positioned proximate the shoulders 440A-440D. For example, as can be seen in FIG. 5, an outer back-up ring 505B is positioned proximate the outer lower shoulder 440C, while an inner back-up ring 510B is positioned proximate the inner lower shoulder 440D. Another outer back-up ring 505A is visible positioned proximate the outer upper shoulder 440A. Although not visible in FIG. 5 due to the orientation of the key seal 400, another inner back-up ring 510A may be positioned proximate the inner upper shoulder 440B. As shown in FIG. 5, the backup rings 505A, 510A, 505B, 510B are shown as being radiused facing key seal 400. It would be understood that back-up rings with other cross-sectional shapes could also be used.

Figure 6:
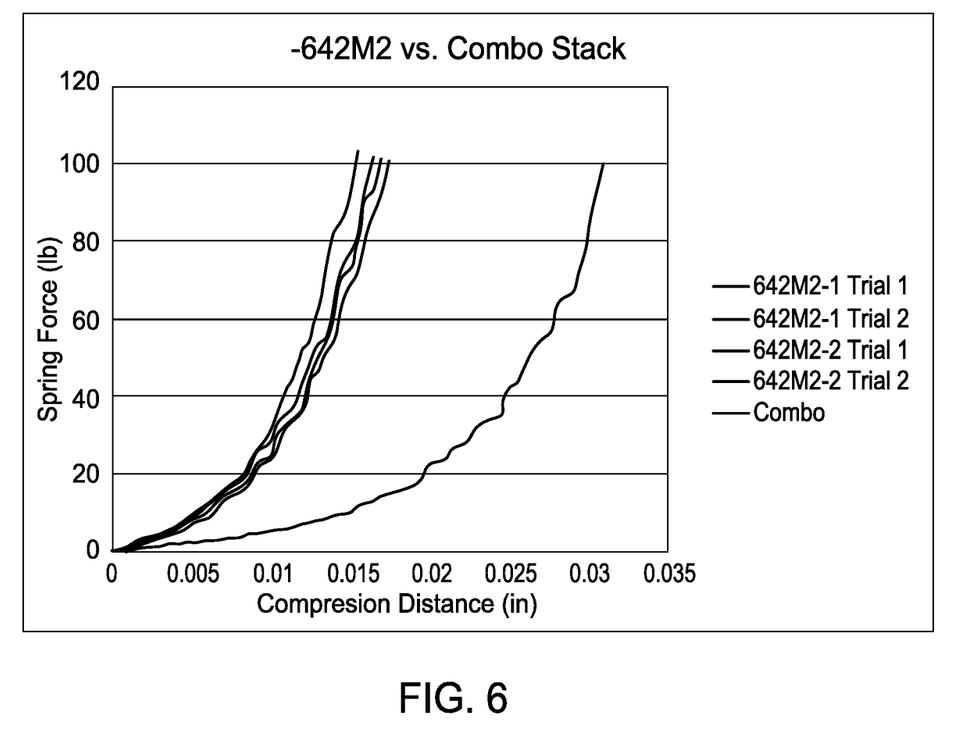
FIG. 6 is a graph showing the spring force versus compression distance of seals having different cross-sections.

When squeezed axially, key seal 400 has better, more linear spring characteristics as compared to seals with other cross-sectional shapes. FIG. 6 illustrates a graph of the spring force versus compression distance of standard O-rings as compared to a key seal made of the same material as the tested O-rings. The first, second and third seal portions 405, 410, 415 of the tested key seal were not integrally formed. Even so, the graph in FIG. 6 illustrates the better and more linear spring characteristics over a much wider range for the tested key seal, as compared to standard O-rings. Seals with oval cross-sectional shapes were also tested, and these shapes also lead to improved performance of standard O-rings. It is believed that a larger volume of ring material in the compression direction was the aid in linearity of the spring force. However, the key seal shape shown in FIG. 4 is preferred.

Figure 7:
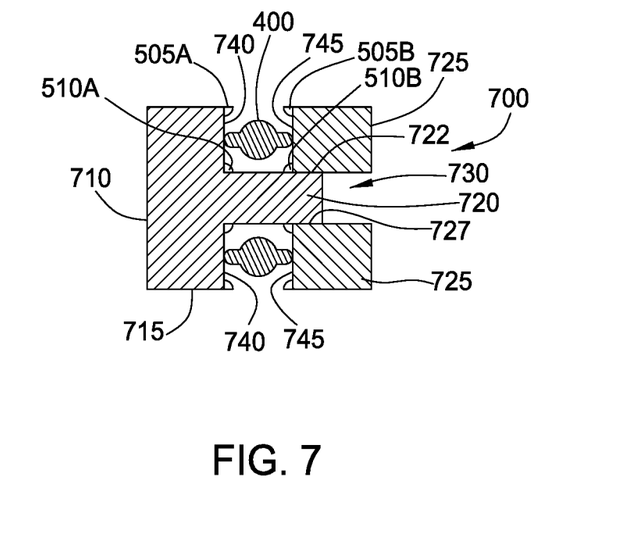
FIG. 7 is an enlarged sectional view of a hydroseal assembly with a key seal, when at rest.

FIG. 7 illustrates an example hydroseal assembly 700. Hydroseal assembly 700 is an aforementioned alternative structure to the seal assemblies 36, 136, discussed above, which may be positioned in the transverse bore 34 of a valve 10. As can be seen, hydroseal assembly 700 includes a hydroseal 710. Hydroseal 710 includes a block section 715 and a pin section 720. Hydroseal assembly 700 also includes a seal 725 through which a bore 730 passes. The pin section 720 of the hydroseal 710 is received within bore 730 of seal 725, such that the outer surface 722 of the pin section 720 is in contact with the inner surface 727 of seal 725.

A key seal 400 fits around pin section 720 of hydroseal 710, such that it resides between the block section 715 of hydroseal 710 and seal 725. Preferably, key seal 400 is squeezed axially between the annular rear surface 740 of block section 715 of hydroseal 710 surrounding the pin, and the annular rear surface 745 of seal 725 surrounding the pin, which in combination of the surface of the pin extending therebetween, form a seal gland having a depth D as shown in FIG. 9. Key seal 400 is therefore an energizer even when the hydroseal assembly 700 is at rest, as shown in FIG. 7. Backup rings 505A, 510A, 505B, 510B are also shown in hydroseal assembly 700.

Figure 8:
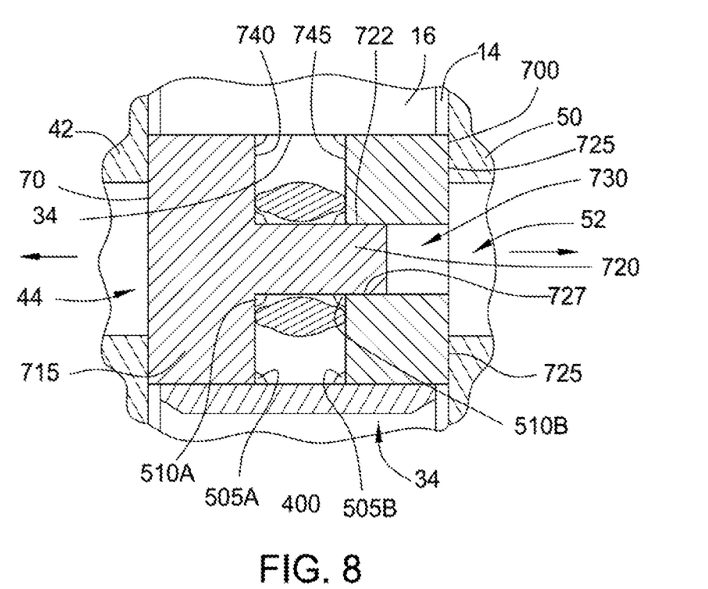
FIG. 8 is an enlarged sectional view of the hydroseal assembly of FIG. 7 as exposed to supply pressure.

FIG. 8 illustrates an enlarged view of a hydroseal assembly 700 in a valve 10 as discussed above, having replaced seal assemblies 36 or 136. Key seal 400 is shown in hydroseal assembly 700 in a valve 10 merely to illustrate an example use for such key seals 400. It will be understood that the use of key seals 400 is not limited to a hydroseal assembly 700 or a valve 10 as shown herein.

The arrows indicate function pressure (from a sample collection bottle) that passes through the longitudinal bore 14 and passes between the transverse bore 34 and the hydroseal/seal 710/725, urging key seal 400 into contact with pin section 720 of hydroseal 710, and away from transverse bore 34, forming a seal against the pin section 720. As the key seal 400 deforms against the id of the pin section 720, function pressure exerts force against the rear surface 740 of the block section 715 of hydroseal 710, as well as the rear surface 745 of the seal 725. The function pressure exerted on the rear surfaces 740, 745 creates a metal-to-metal seal between the hydroseal 710 and seal plate 42, and between the seal 725 and seal plate 50.

In FIG. 9, the arrows indicate supply pressure (from wellbore fluids) that passes through bore 44 in the seal plate 42 and bore 52 in seal plate 50, urging key seal 400 away from pin section 720 of hydroseal 710 and against the transverse bore 34, forming a seal against the transverse bore 34 of seal carrier 16. As key seal 400 deforms against the id of the transverse bore 34, the supply pressure exerts force against the rear surface 740 of the block section 715 of hydroseal 710, as well as the rear surface 745 of the seal 725. The supply pressure exerted on the rear surfaces 740, 745 creates a metal-to-metal seal between the hydroseal 710 and seal plate 42, and between the seal 725 and seal plate 50.

As noted above, key seal 400 is preferably squeezed axially between the block section 715 of hydroseal 710 and seal 725. Key seal 400 therefore acts as a spring when the hydroseal assembly 700 is at rest, as well as an actual seal. At low pressures, it is important to ensure that hydroseal 710 and seal 725 engage the seal plates 42, 50, respectively. Because key seal 400 is squeezed axially, it exerts force against both the hydroseal 710 and the seal 725 like a spring to ensure contact. However, sealing between hydroseal/seal 710/725 and the respective seal plates 42, 50 at higher pressure is due to forces exerted on the rear surfaces 740, 745 due to supply or function pressure.

FIGS. 7, 8, and 9 also show the hydroseal assembly 700 with back-up rings 505A, 510A, 505B, 510B for key seal 400, as discussed above in connection with FIG. 5. Such back-up rings 505A, 510A, 505B, 510B provide additional support for the key seal 400 carried by the pin section 720 of hydroseal 710. Back-up rings 505A, 510A, 505B, 510B may be made of PEEK (poly-ether-ether-ketone). The use of the back-up rings 505A, 510A, 505B, 510B permits the valve 10 to be operated at higher pressures and temperatures than valves without the back-up rings 505A, 510A, 505B, 510B.

As shown, the back-up rings 505A, 510A, 505B, 510B are generally radiused facing the key seal 400. This is preferred due to the shape of shoulders 440A-440D. It would be understood that back-up rings with other cross-sections could also be used. Back-up rings 505A, 505B and 510B are all positioned proximate junctions between components which are moveable with respect to one another. For example, back-up ring 505A is positioned proximate the junction between block section 715 of hydroseal 710 and transverse bore 34 of seal carrier 16. Back-up ring 505B is positioned proximate the junction between seal 725 and transverse bore 34 of seal carrier 16. Back-up ring 510B is positioned proximate the junction between seal 725 and the pin section 720 of hydroseal 710. These back-up rings further help to prevent extrusion of key seal 400 at higher pressures. As shown, back-up ring 510A is not positioned proximate a junction between components which are moveable with respect to one another, as it is positioned merely at the junction between the pin section 720 and block section 715 of hydroseal 710. Thus, in this embodiment, no extrusion of the key seal 400 would be possible in that area. While all back-up rings 505A, 510A, 505B, 510B are optional, back-up ring 510A is particularly subject to removal.

As shown, back-up rings 505A, 510A, 505B, 510B are somewhat triangular in cross-section, with the hypotenuse of the triangle being radiused toward key seal 400.

Thus, there has been shown and described an embodiment of a novel annular key seal and hydroseal assembly. Such a key seal is not limited to use in a hydroseal assembly or valve as discussed above, and could alternatively be used in other valves, regulators, etc. Similarly, a hydroseal assembly as disclosed herein is not limited to use in a valve as disclosed. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:
1. A sliding seal assembly comprising:
a body having opening extending therethrough, the opening including a circumferential wall;

a first sealing element comprising a block and a pin extending therefrom disposed in the opening, wherein the block includes a first annular wall extending around the pin, a second wall facing away from the first annular wall, the second wall is a distal planar second wall and a circumferential wall interconnecting the first annular wall and the distal planar second wall;

a second sealing element comprising an annular plate having a plate opening therethrough disposed in the opening in the body, the pin of the first sealing element extending inwardly of the plate opening of the second sealing element, wherein the second sealing element includes a third annular wall surrounding the plate opening therethrough and a fourth annular wall facing away from the third annular wall, the third annular wall of the second sealing element facing the first annular wall of the first sealing element, the pin moveable within the opening and in conjunction with the first and third annular walls forming a seal gland therebetween, the depth of the seal gland extending from the pin to the distal circumferential ends of the first and the second annular walls;

a sealing ring disposed in the seal gland, the sealing ring comprising a body having a first width which is less than the depth of the seal gland and a second width, extending transverse to the first width, greater than the first width, the sealing ring disposed in the body such that the sealing ring contacts the first annular wall and the opposed, third annular wall across the second width;

a first seal plate having a first sealing surface having an opening therethrough, the first sealing surface directly contacting the second wall of the first sealing element and a second sealing plate having a second sealing surface directly contacting the fourth annular wall of the second sealing element;

wherein in the sealing ring is moveable between a first sealing ring position wherein the sealing ring contacts the pin and a second sealing ring position wherein the sealing ring contacts the circumferential wall of the opening.

2. The sliding seal assembly of claim 1, wherein the body is moveable between a first position wherein the second surface overlies the plate opening in the first seal plate and the fourth surface overlies the plate opening in the second sealing plate, and a second position wherein the second surface does not overlie the plate opening in the first seal plate and the fourth surface does not overlie the plate opening in the second sealing plate.

3. The sliding seal assembly of claim 1, wherein in the sealing ring is moveable between a first sealing ring position wherein the sealing ring contacts the pin and a second sealing ring position wherein the sealing ring contacts the circumferential wall of the opening.

4. The sliding seal assembly of claim 3, wherein body is received within a valve bore, and the sealing ring contacts the circumferential wall when the pressure in the valve bore exceeds the pressure in the openings in the first and second seal plates.

5. The sliding seal assembly of claim 3, wherein body is received within a valve bore, and the sealing ring contacts the circumferential wall when the pressure in the valve bore is less than the pressure in the openings in the first and second seal plates.

6. The sliding seal assembly of claim 1, wherein body is received within a valve bore in a housing; and
   a spring is located between the body and the housing, and the spring biases the body to the first position.

7. The seal assembly of claim 1, wherein the sealing ring body includes a first portion having the first width, and a second and third portion connected thereto across the second width.

8. The seal assembly of claim 1, wherein the width of the seal gland between the first and third annular walls is larger than the first width of the seal body.

9. The seal assembly of claim 1, wherein in a free state, the width of the sealing ring is greater than the width of the seal gland between the first and third annular walls.

10. The seal assembly of claim 1, wherein the depth of the seal gland is greater than the first width.

* * * * *